(12) United States Patent
Zhao

(10) Patent No.: US 8,395,466 B2
(45) Date of Patent: Mar. 12, 2013

(54) BIONIC TELESCOPIC MATRIX UNIT

(76) Inventor: Dezheng Zhao, Wulumuqi (CN)

( * ) Notice: Subject to any disclaimer, the term of this patent is extended or adjusted under 35 U.S.C. 154(b) by 0 days.

(21) Appl. No.: 13/496,343

(22) PCT Filed: Dec. 7, 2010

(86) PCT No.: PCT/CN2010/079486
§ 371 (c)(1),
(2), (4) Date: Jun. 4, 2012

(87) PCT Pub. No.: WO2011/050758
PCT Pub. Date: May 5, 2011

(65) Prior Publication Data
US 2012/0229237 A1   Sep. 13, 2012

(30) Foreign Application Priority Data
Oct. 27, 2009  (CN) .......................... 2009 1 0113501

(51) Int. Cl.
*H01F 7/00* (2006.01)
(52) U.S. Cl. ........ 335/229; 335/255; 335/262; 335/278; 335/279; 335/296
(58) Field of Classification Search .................. 335/229, 335/255, 262, 270, 278, 279, 296; 417/412, 417/413.1
See application file for complete search history.

(56) References Cited

U.S. PATENT DOCUMENTS

| | | | | |
|---|---|---|---|---|
| 2,532,876 A * | 12/1950 | Asche et al. | ................... | 335/230 |
| 2,792,536 A * | 5/1957 | Immel | ........................... | 335/279 |
| 3,720,485 A * | 3/1973 | Holman, Jr. | ................. | 417/413.1 |
| 3,750,067 A * | 7/1973 | Fletcher et al. | ................. | 335/296 |
| 4,176,411 A * | 12/1979 | Runge | .............................. | 623/3.11 |
| 4,516,102 A * | 5/1985 | Rask | ............................... | 335/267 |
| 4,683,669 A * | 8/1987 | Greer, Jr. | ......................... | 40/414 |
| 5,394,132 A * | 2/1995 | Poil | ................................ | 335/232 |
| 5,717,259 A * | 2/1998 | Schexnayder | .................. | 310/11 |
| 7,154,362 B2 * | 12/2006 | Ohnstein et al. | .............. | 335/229 |

FOREIGN PATENT DOCUMENTS

| | | |
|---|---|---|
| CN | 2241613 Y | 12/1996 |
| CN | 2754266 Y | 1/2006 |

(Continued)

OTHER PUBLICATIONS

International Search Report, Mar. 17, 2011, from International Phase of the instant application.

(Continued)

*Primary Examiner* — Ramon Barrera
(74) *Attorney, Agent, or Firm* — Jackson Patent Law Office

(57) ABSTRACT

A bionic telescopic matrix unit is disclosed, which is composed of a slide shaft (6), a metal guide pipe (7), an elastic telescopic shell (2) and an electromagnetic coil (3). In the elastic telescopic shell (2), the slide shaft (6) made of a permanent magnet extends into the metal guide pipe (7) via the front end of said pipe (7) and comes into sliding contact with the inner tube wall of the metal guide pipe (7). The rear end of the metal guide pipe (7) and the front end of the slide shaft (6) protrude out through the front and back openings respectively of said elastic telescopic shell (2), said front and back openings of said elastic telescopic shell (2) being fixedly connected to the outer peripheral wall of the metal guide pipe (7) and to the slide shaft (6) respectively, thus connecting the metal guide pipe (7) with the slide shaft (6). The elongation length of the elastic telescopic shell (2) corresponds to the reciprocating stroke of the slide shaft (6) in the guide pipe (7); the electromagnetic coil (3) wound on the outer peripheral wall of the metal guide pipe (7) is covered by the elastic telescopic shell (2). Two ends of the electromagnetic coil (3) are duly connected with the positive and negative poles of a power supply. The telescopic matrix unit can simulate the functions of movement caused by animal muscle tissue extension, thus enabling greater flexibility and freedom in the mechanical limb movements of humanoid, etc. robots.

8 Claims, 4 Drawing Sheets

FOREIGN PATENT DOCUMENTS

| CN | 201143199 Y | 11/2008 |
|---|---|---|
| CN | 101717064 A | 6/2010 |

OTHER PUBLICATIONS

English Translation of the Written Opinion of the International Search Authority, May 7, 2012, from International Phase of the instant application.

English Translation of International Preliminary Report on Patentability Chapter I, May 1, 2012, from International Phase of the instant application.

English Translation of International Preliminary Report on Patentability Chapter II, May 10, 2012, from International Phase of the instant application.

* cited by examiner

BIONIC TELESCOPIC MATRIX UNIT

TECHNICAL FIELD

This invention involves applications in MEMS technology, especially a bionic telescopic matrix unit.

BACKGROUND TECHNOLOGY

1. Prior Art

Presently, most power mechanisms are mainly driven by electric motors, engines or hydraulic motors. In particular, industrial robots in many factories are driven by electric motors. This limits joint related activities in the mechanical arms of those robots. In addition, existing robotic research is focused on areas such as improving walking balance and control of humanoid robots and quadruped-like mechanisms. The bionic content is rather small. The movement of humanoid robot and other quadruped-like mechanisms is very stiff. Consequently, their flexibility is limited.

2. Description of Invention

The object of this invention is to provide a bionic telescopic matrix unit, which is capable of mimicking the animal movement resulting from stretching and contraction of muscle tissue. It can then be utilized fully in humanoid robot or quadruped-like mechanisms so that humanoid robot or quadruped-like mechanisms can move freely and flexibly.

This invention is implemented as follow: It is a bionic telescopic matrix unit. This telescopic matrix unit is composed of a slide shaft, a metal guide pipe, an elastic telescopic shell and an electromagnetic coil. In the elastic telescopic shell, the slide shaft made of a permanent magnet extends into the metal guide pipe via the front end of the pipe and comes into sliding contact with the inner tube wall of the metal guide pipe. The rear end of the metal guide pipe and the front end of the slide shaft protrude out through the back and front openings of the elastic telescopic shell, respectively. Furthermore, the front and back openings of the elastic telescopic shell are secured to the outer wall of the metal slide pipe and the slide shaft to connect the metal guide pipe to the slide shaft. The elongation length of the elastic telescopic shell matches the reciprocating stroke of the slide shaft in the metal guide pipe. The electromagnetic coil, which is wound around the outer peripheral wall of the metal guide pipe, is covered by the elastic telescopic shell. The two ends of the electromagnetic coil are appropriately connected to the positive and negative poles of a power supply.

The principle of this invention is as follows: In each bionic telescopic matrix unit, the slide shaft made of a permanent magnet slides back and forth under the influence of magnetic force generated by the electromagnetic coil wound around the outer peripheral wall of the metal guide pipe. The mechanism of this bionic telescopic matrix unit is similar to the telescopic function of muscle cells. It mimics the principle of muscle cell stretching and contraction. Collectively as a whole, each group of bionic telescopic matrix units can stretch and contract in a reciprocating manner at the same time to provide a bionic telescopic tissue. It can be used be used in fields such as humanoid robots and quadruped-like mechanisms. This invention is capable of mimicking movement caused by animal muscle extension to enable humanoid robot or quadruped-like mechanisms to move more freely and flexibly.

DESCRIPTION OF ATTACHED DRAWINGS

PREFERRED EMBODIMENT

Figure 1:
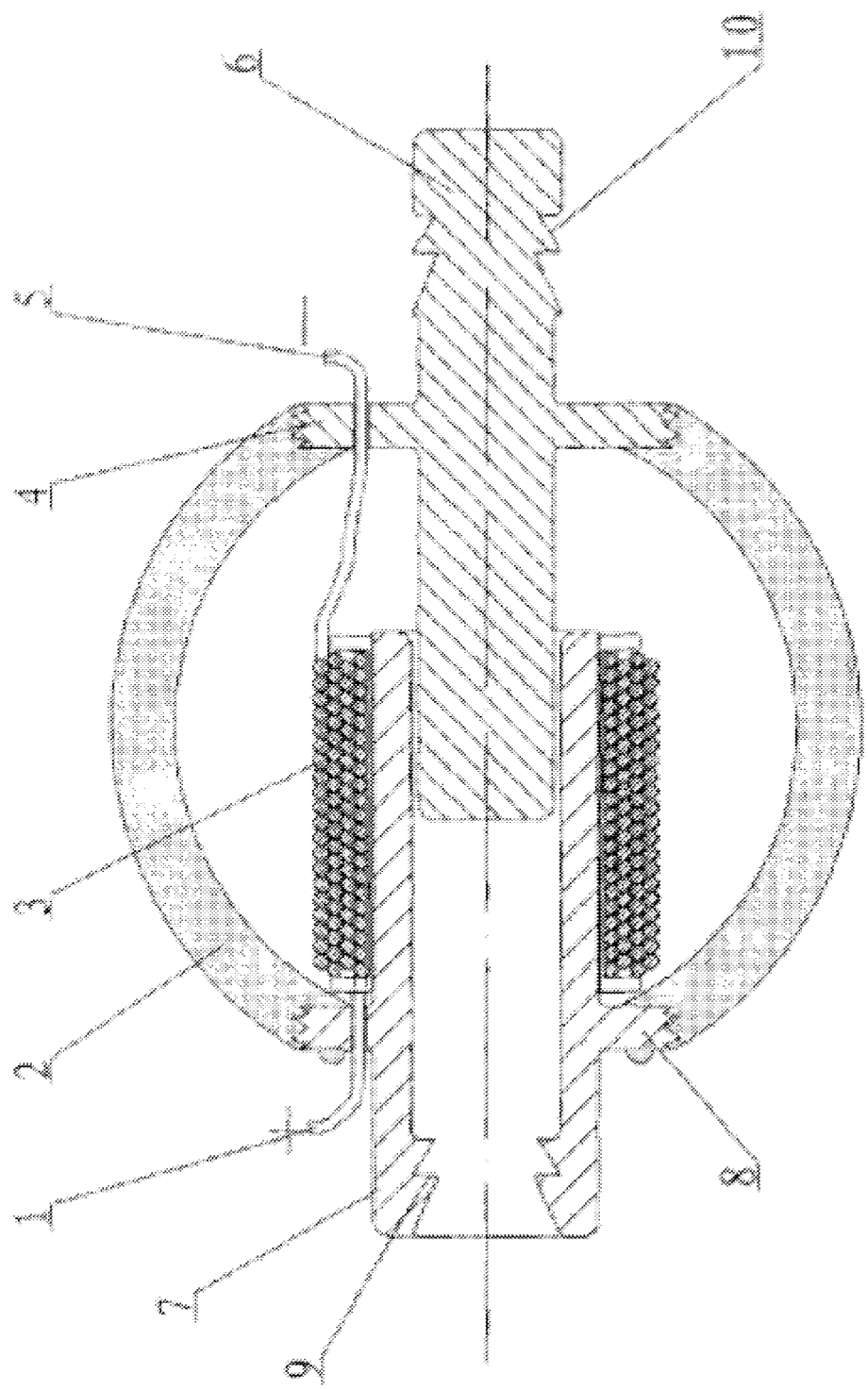
FIG. 1 is a schematic diagram of a cross-sectional view of this invention when each bionic telescopic matrix unit described by this invention is in an extended state.

A bionic telescopic matrix unit is shown in FIG. 1 through FIG. 4. This telescopic matrix unit is composed of a slide shaft (6), a metal guide pipe (7), an elastic telescopic shell (2) and an electromagnetic coil (3). In the elastic telescopic shell (2), the slide shaft (6) made of a permanent magnet extends into the metal guide pipe (7) via the front end of said pipe (7) and comes into sliding contact with the inner tube wall of the metal guide pipe (7). The rear end of the metal guide pipe (7) and the front end of the slide shaft (6) protrude out through the back and front openings of the elastic telescopic shell (2), respectively. Furthermore, the front and back openings of the elastic telescopic shell (2) are secured to the outer wall of the metal slide pipe (7) and the slide shaft (6) to connect said metal guide pipe (7) to said slide shaft (6). The elongation length of the elastic telescopic shell (20 matches the reciprocating stroke of the slide shaft (6) in the metal guide pipe (7). The electromagnetic coil (3), which is wound around the outer peripheral wall of the metal guide pipe (7), is covered by the elastic telescopic shell (2). The two ends of the electromagnetic coil (3) are appropriately connected to the positive and negative poles of a power supply.

Each telescopic matrix unit can be lined up from end to end. This means that the front end of the slide shaft (6) of one telescopic matrix unit can be connected to the rear end of the metal guide pipe (7) of an adjacent telescopic matrix unit to create a bionic telescopic chain. Bionic telescopic chains can be linked together to create a bionic telescopic tissue. Specifically, in a bionic telescopic tissue the electromagnetic coil (3) of each bionic telescopic matrix unit is connected in parallel with each other unit to form the two input terminals to be appropriately connected to the power supply of said bionic telescopic tissue. These two input terminals shall be matched with the power supply. Of course, in two adjacent bionic telescopic chains, the telescopic matrix units in one bionic telescopic chain are arranged in a staggered manner relative to the telescopic matrix units of the other bionic telescopic chain. Furthermore, these two chains can be connected by using a flexible soft artificial bionic material to make it structurally more compact and inseparable.

The front end of the slide shaft (6) of a telescopic matrix unit is equipped with a catch pin (10). It can be securely connected to the catch socket (9) located in the back end of the inner wall of the metal guide pipe (7) of another telescopic matrix unit.

The metal guide pipe (7) is made of a titanium alloy. The elastic telescopic shell (2) is made of an elastic, abrasion-resistant rubber. The front and back openings of the elastic telescopic shell (2) are securely attached to the front (8) and back (4)* retaining rings located on the slide shaft (6) and metal guide pipe (7), respectively. The front (8) and back (4)* retaining rings match the reciprocating stroke of the slide shaft (6) inside the metal guide pipe (7). The core of the electromagnetic coil (3) is made of copper.

*sic; back (8) and front (4) retaining rings?—Translator's note.

As shown in FIG. 1 through FIG. 4, the elastic telescopic shell (2) is overall made of an elastic plastic material. FIG. 1 shows its original state with no current present. The next figure shows the state of contraction after power is applied. If a multiple number of bionic telescopic matrix units are linked together, a muscle tissue-like bionic telescopic tissue can be formed.

In summary, this invention combines the state of the art in several related fields, including bionic technology, machinery, electromagnetic technology, electronic control and lubrication structure. High-tech MEM technology can be utilized to eventually achieve sub-micron dimensions and similarly manufactured VLSI circuits. If tens of thousands of bionic telescopic matrix units are linked together, the corresponding mechanical movement stroke will exceed 25% of its total length. These mechanical bionic telescopic tissues can be attached to a metal skeleton hinged to a humanoid robot or a piece of a quadruped-like mechanism and this will give more flexibility and freedom to said humanoid robot or quadruped-like mechanism.

Figure 2:
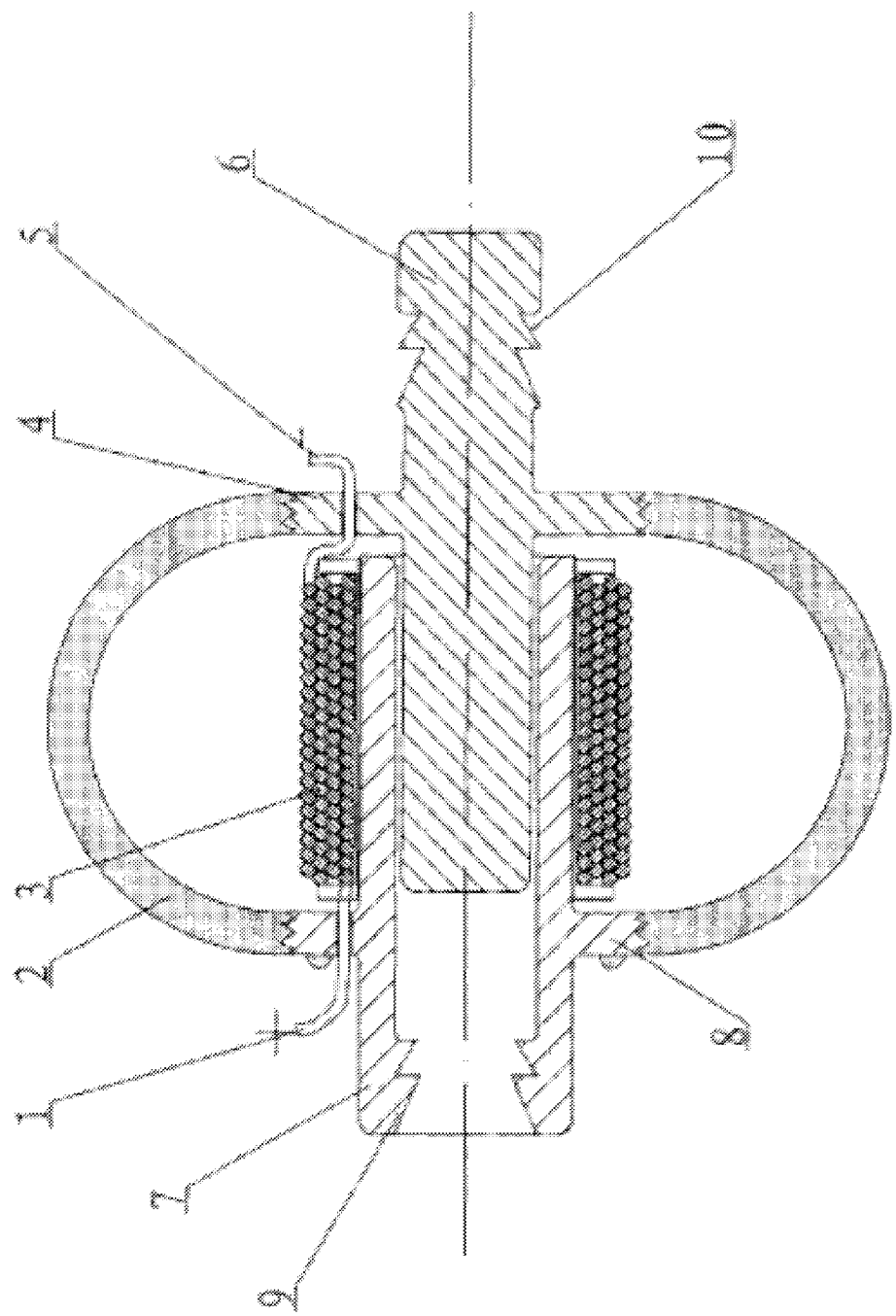
FIG. 2 is a schematic diagram of a cross-sectional view of this invention when each bionic telescopic matrix unit described by this invention is in a contracted state.
Figure 3:
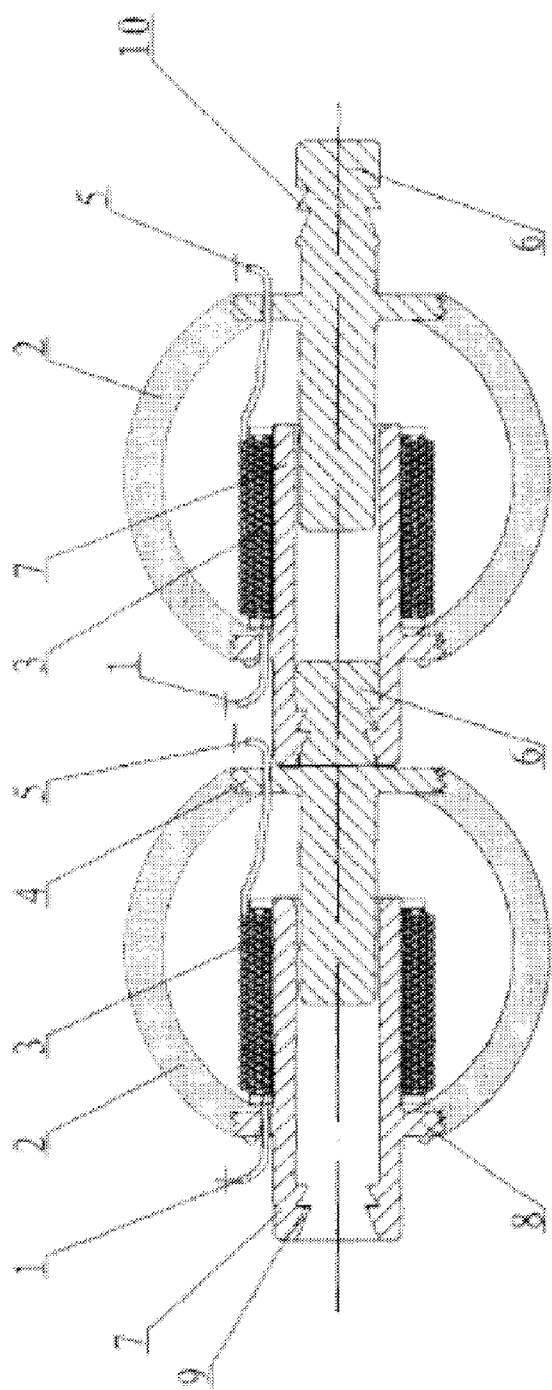
FIG. 3 is a schematic diagram of a cross-sectional view illustrating the connection of two bionic telescopic matrix units described in this invention.

When multiple strands of bionic telescopic tissue are attached to a hinged mechanical arm, the two ends of each bionic telescopic matrix unit are connected to the power supply. A magnetic field is generated by the current. This magnetic field will attract the moving block in the middle to move. The elastic telescopic shell (2) will be distorted; resulting in a displacement stroke as shown in the FIG. 2. This is the contracted state. After a movement is completed by the bionic telescopic matrix unit, the current will be disconnected. The bionic telescopic matrix unit will recover. In the event recovery is not possible due to the presence of other external forces, the unit needs to be stretched or contracted by another strain of muscle-like bionic telescopic tissue because the mechanical arm only acts as leverage in this case. FIGS. 1 and 2 show the extended and contracted states, respectively.

Figure 4:
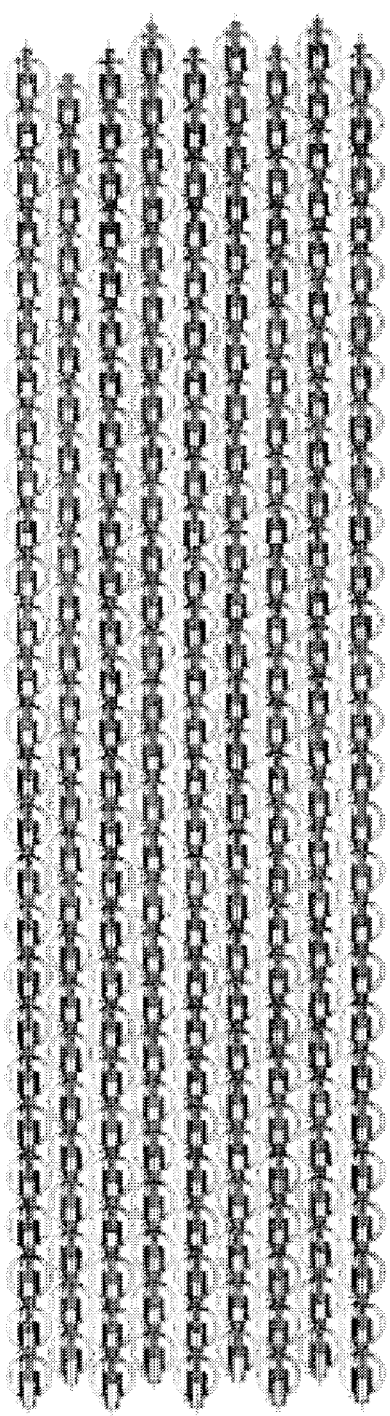
FIG. 4 is a schematic diagram of the structure of a bionic telescopic chain constructed by connecting bionic telescopic matrix units to provide a bionic telescopic tissue formed by bionic telescopic chains.

In this invention, various movements can be achieved by means of controlling the current. Even if individual matrix units may malfunction, the overall action and movement will not be affected. Using electrical signals for current control is analogous to responding to neural stimulation. For instance, FIG. 4 is a schematic diagram depicting the interconnection of numerous bionic telescopic matrix units. The power supply must be connected in parallel. The amount of force applied can be accurately controlled by changing the length of each strand of bionic telescopic tissue. Matrix units are interconnected in a flexible manner. These are soft and their direction can be changed. At the same time, constant proportionality is an attribute exhibited by a bionic telescopic tissue. The same mechanics apply to bionic telescopic tissues of various sizes. For the same bionic telescopic tissue, if the number of bionic telescopic matrix units can increase substantially, then a great deal of stretching force is given to the mechanical arm. Therefore, for mechansims driven by electric motors that are difficult to make, this invention can act as a revolutionary micro-electromechanical tissue that can be applied to various fields of manufacturing technology.

Original Application No. 2000910113501.X
Application Date: Jun 12, 2010 (06/12/2010)
Name of Applicant: ZHAO Dezheng
Address:83000
Room 502, Unit 2, Yinyuan Building, 188 Tainjin South Road, Urumqi, Xinjiang
No 188 Tianjinnan Road, Yinuan Dasha 2-502 Xinjiang Xinshiqu 830000 China

The invention claimed is:

1. A bionic telescopic matrix unit which can be characterized by the following characteristics: The telescopic matrix unit is comprised of a slide shaft, a metal guide pipe, an elastic telescopic shell and an electromagnetic coil; in the elastic telescopic shell, the slide shaft made of a permanent magnet extends into the metal guide pipe via the front end of said pipe and comes into sliding contact with the inner tube wall of the metal guide pipe; the rear end of the metal guide pipe and the front end of the slide shaft protrude out through the back and front openings of the elastic telescopic shell, respectively; the front and back openings of the elastic telescopic shell are secured to the outer wall of the metal slide pipe and the slide shaft to connect said metal guide pipe to said slide shaft; the elongation length of the elastic telescopic shell matches the reciprocating stroke of the slide shaft in the metal guide pipe; the electromagnetic coil, which is wound around the outer peripheral wall of the metal guide pipe, is covered by the elastic telescopic shell; and the two ends of the electromagnetic coil are appropriately connected to the positive and negative poles of a power supply.

2. A bionic telescopic matrix unit as described in claim 1 which can be characterized by the following characteristics: The front end of the slide shaft of an adjacent telescopic matrix unit and the rear end of the metal guide pipe of another telescopic matrix unit are securely linked together in a coordinated manner to form a bionic telescopic chain; bionic telescopic chains are coordinated to form a bionic telescopic tissue; in a bionic telescopic tissue the electromagnetic coil of each telescopic matrix unit is connected in parallel to the two power supply input terminals of the bionic telescopic tissue, these power supply input terminals being matched with the power supply.

3. The bionic telescopic matrix unit as described in claim 2 which can be further characterized in that a locking pin is placed at the front end of the slide shaft of a telescopic matrix unit to be securely linked to the locking socket located at the rear end of the metal guide pipe of another telescopic matrix unit.

4. The bionic telescopic matrix unit as described in claim 2 which can be further characterized in that between two adjacent bionic telescopic chains, the telescopic matrix units of one bionic telescopic chain are lined up with the telescopic matrix units of the other bionic telescopic chain in a staggered manner.

5. The bionic telescopic matrix unit as described in claim 1 which can be further characterized in that the metal guide pipe is made of a titanium alloy.

6. The bionic telescopic matrix unit as described in claim 1 which can be further characterized in that the elastic telescopic shell is made of an abrasion resistant rubber.

7. The bionic telescopic matrix unit as described in claim 1 which can be further characterized in that the front and back openings of the elastic telescopic shell are secured to front and back retaining rings located on the slide shaft and the metal guide pipe, respectively, also matching the reciprocating stroke.

8. The bionic telescopic matrix unit as described in claim 1 which can be further characterized in that the core of the electromagnetic coil is made of copper.

* * * * *